Sept. 20, 1971   W. F. JORDAN   3,605,708
THROTTLE LOCKING SYSTEM
Filed Oct. 29, 1969   2 Sheets-Sheet 2

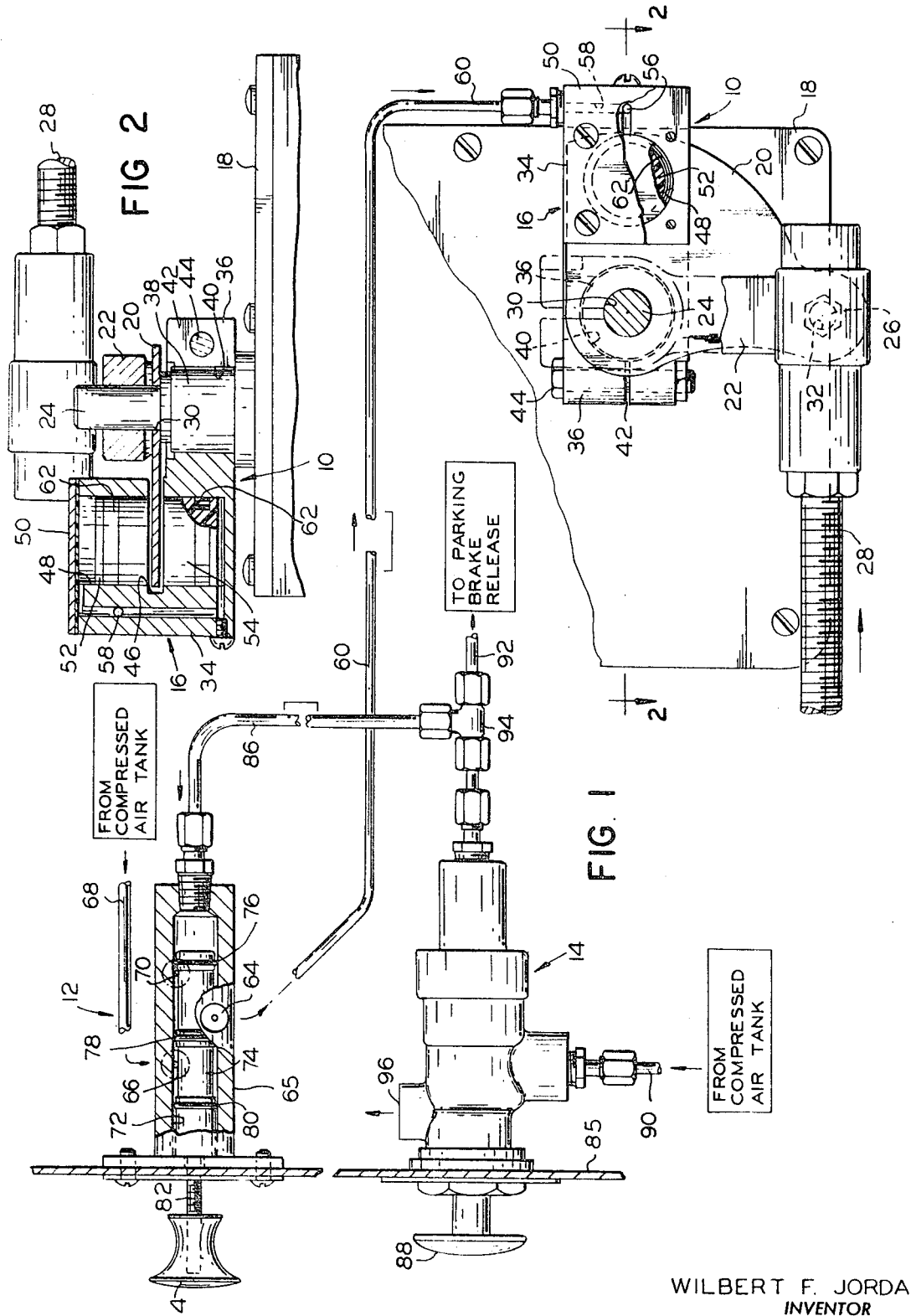

WILBERT F. JORDAN
INVENTOR

BY
BUCKHORN, BLORE, KLARQUIST & SPARKMAN
ATTORNEYS

United States Patent Office 3,605,708
Patented Sept. 20, 1971

3,605,708
THROTTLE LOCKING SYSTEM
Wilbert F. Jordan, 2148 SE. Salmon St.,
Portland, Oreg. 97214
Filed Oct. 29, 1969, Ser. No. 872,243
Int. Cl. F02d 11/02; F02b 77/00; F16d 55/00
U.S. Cl. 123—98
9 Claims

ABSTRACT OF THE DISCLOSURE

A throttle lock system has a metal plate connected to and moved by the throttle linkage of a truck engine in a direction parallel to the faces of the plate. Plungers positioned on opposite sides of the plate and mounted in stationary cylinders are moved toward the opposite faces of the plate by compressed air under control of a manually actuated valve to clamp the plate and lock the throttle in selected position. The system is used to set the speed of the engine of a freight truck to maintain air conditioning or heating equipment and the like in operation when the truck is parked. The system includes an automatic release for the throttle lock whenever the spring brakes employed on such trucks are released so that the throttle will not be locked when the truck is in motion.

BACKGROUND OF INVENTION

The present invention was developed for application to large size over the highway freight trucks having auxiliary equipment such as air conditioning or heating apparatus which should be kept in operation when the truck is parked, although it has utility in any type of motor vehicle such as a bus which requires to be operated at a speed above idling speed when the vehicle is parked in order to maintain other apparatus in operation, and also has utility for certain stationary engine installations.

Large trucks including tractor-trailer combinations are many times equipped with air conditioning and/or heating apparatus driven from or dependent on the operation of the truck engine either directly or indirectly. This means that it is desired that the truck engine be operated at a speed above the normal idling speed of such engine when the driver stops for lunch, or for other reasons. It is possible to merely install a conventional hand operated throttle of the type which is frictionally held in adjusted position after being manually set. Such throttles are difficult to accurately adjust if the friction holding them in position is sufficient to insure that the speed of the engine is accurately maintained.

In accordance with the present invention a system is provided which enables the operator of the truck to adjust the speed of the truck engine with the usual foot throttle or accelerator and then to lock the throttle linkage securely in adjusted position by manually actuating a control element mounted in easy reach of the operator of the vehicle. The locking of the throttle linkage can be released at any time by reverse actuation of the control element, and furthermore the invention contemplates automatic release of the lock for the throttle linkage when the parking brakes of the vehicle are released so that the throttle will not be held in advanced position by the locking device when the truck is being driven.

It will be apparent, however, that the throttle locking system can be employed on other types of motor vehicles wherein it is desirable that the engine of the vehicle be driven above idling speed during parking in order to operate accessory equipment, and can also be employed with stationary engines if desired.

It is therefore an object of the present invention to provide a throttle locking system, particularly suitable for application to an internal combustion engine of a vehicle, which will enable the throttle linkage of such engine to be releasably locked in any adjusted position, and which can also include an automatic release of the throttle when the parking brakes of the vehicle are released.

BRIEF DESCRIPTION OF DRAWINGS

FIG. 1 is a schematic plan view of a throttle locking system for one type of diesel truck engine with parts in section or broken away to show internal structure;

FIG. 2 is a vertical section through a throttle locking device forming part of the system of FIG. 1, taken on the line 2—2 of FIG. 1;

DESCRIPTION OF THE PREFERRED EMBODIMENTS

Embodiment of FIGS. 1 and 2

Figure 3:
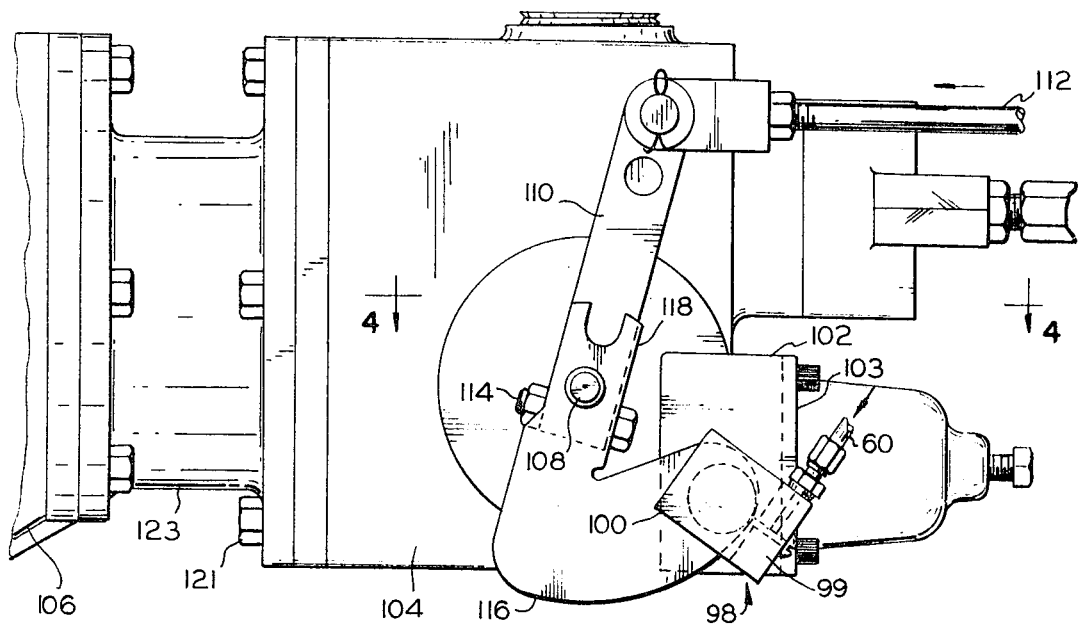
FIG. 3 is a side elevation of a modified throttle locking device for a different type of diesel truck engine.

The throttle locking system shown in FIGS. 1 and 2 includes a throttle linkage locking mechanism 10, a throttle locking control valve 12 and also a spring brake control valve 14 (of conventional construction). The throttle locking mechanism 10 includes a plate locking structure 16 shown, for example, as being mounted upon the cover 18 for the governor housing a V-71 type General Motors diesel engine. It also includes an arcuate plate 20 secured to and moved by a speed control arm 22 forming part of the throttle linkage of the engine and having one end secured to a throttle control shaft 24 projecting upwardly through and journaled in the cover 18. The other end of the speed control arm 22 is connected by a pivot 26 to a throttle control push rod 28 connected to the accelerator (not shown) of the vehicle in which the engine referred to is mounted.

The arcuate plate 20 is positioned below the arm 22 and has an aperture 30 receiving and fitting the shaft 24. The plate 20 has its periphery concentric with the throttle control shaft 24 and has another aperture 32 receiving and fitting the pivot 26 between the arm 22 and the push rod 28. It will be apparent that the arcuate plate 20 will be pivoted about the shaft 24 when the speed control arm 22 is pivoted by the push rod 28 and that the movement of the arcuate plate 20 will be in a direction parallel to the surfaces of the opposed faces of the plate 20.

The plate locking structure 16 has a plate clamping portion 34 and a support portion 36 extending horizontally from the plate clamping portion 34. In the type of engine referred to above, the throttle control shaft 24 extends upwardly from the cover 18 of the governor housing through a sleeve 38 forming part of the governor housing cover 18. The support portion of the plate locking structure 16 has an aperture 40 fitting over the sleeve 38. The support portion 36 is also provided with a slot 42 extending to the aperture 40 as shown most clearly in FIG. 1. A bolt 44 extending laterally through the slotted portion of the support portion 36 is employed to clamp the plate locking structure 16 to the sleeve 38 to hold this locking structure in a fixed position with respect to the cover 18 of the governor mechanism.

The clamping portion 34 of the plate locking structure 16 has a plate receiving slot 46 extending horizontally part way through the plate clamping portion 34 from the direction of the support portion 36 of the plate locking structure. This slot 46 receives the arcuate portion of the plate 20 and it will be apparent that pivoting of the speed control arm 22 about the throttle control shaft 24 will move the arcuate portion of the plate 20 through the slot 46 in a direction parallel to the face surfaces of the plate 20.

The plate clamping portion 34 of the plate locking structure 16 contains a bore 48 extending downwardly from its upper surface so as to intersect and cross the slot 46 at right angles. The bore 48 has its upper end closed by a cover plate 50 and terminates short of the lower surface of the plate clamping portion 34 so as to provide an upper cylinder for an upper plunger 52 and a lower cylinder for a lower plunger 54 above and below the plate 20, respectively.

The plate clamping portion 34 of the plate locking structure contains a plurality of ducts including a duct 56 connecting the upper and lower portions of the bore 48 to an inlet and outlet duct 58, which in turn is connected to a compressed air conduit 60. It will be apparent that the introduction of compressed air through the ducts 58 and 56 into the upper and lower portions of the bore 48 will force the plungers 52 and 54 toward each other to clamp the plate 20 in adjusted position. The plungers 52 and 54 are preferably made of a laminated fabric impregnated with a thermosetting resin so as to provide adequate frictional engagement with the plate 20. The plungers 52 and 54 are each provided with a rubber or other suitable elastomer sealing cup 62, one of which is shown in cross section in FIG. 2.

The compressed air conduit 60 is also connected to the output port 64 of the throttle locking control valve 12. This valve has a valve casing 65 containing the port 64 and also an input port 66 connected to an input conduit 68 having its other end connected to a tank of compressed air carried by the vehicle. The casing of the valve 12 also has an exhaust port 70 and has an internal longitudinally extending bore 72 in which is positioned a valve spindle 74 longitudinally slidable in the bore 72. The spindle 74 has three O-rings 76, 78 and 80 positioned in annular grooves spaced longitudinally of the spindle 74 and engaging the interior of the bore 72 to provide a pair of valve chambers, one between the O-rings 76 and 78, and another between the O-rings 78 and 80.

In the position of the valve spindle 74 shown in FIG. 1, the outlet port 64 and exhaust port 70 are both in communication with the valve chamber between the O-rings 76 and 78 so that the interiors of the cylinders in the bore 48 of the plate locking structure 16 are connected to the atmosphere and the plate 20 is freely movable between the plungers 52 and 54. The spindle 74 in the valve 12 has a reduced portion 82 extending from one end thereof through the front end of the valve casing 65 and having an actuating knob 84 attached thereto. The valve casing 65 of the valve 12 may have its front portion attached to the dash structure 85 or other wall portion of the operators compartment of the vehicle with the knob 84 projecting into the operators compartment. Upon pushing the knob to the right in FIG. 1, the valve spindle 74 is moved to a position in which both the output port 64 and the input port 66 of the valve 12 are in communication with the valve chamber between the O-rings 78 and 80. In this position of the valve spindle, compressed air from the conduit 68 is supplied through the conduit 60 to the cylinders of the plate locking structure 16 to force the plungers 52 and 54 against the plate 20 to hold such plate in adjusted position. It will be apparent that the plungers 52 and 54 provide a floating, gripping action in that they will accommodate themselves to the position of the plate 20 relative to the sides of the slot 46 so that any inaccuracies in positioning the plate 20 in the slot 46 do not affect the operation of the plate locking structure.

The throttle locking control valve has a connection to the spring operated brake system of the vehicle through a compressed air conduit 86 to insure that the plate 20 is released from locking engagements by the plungers 52 and 54 whenever the spring parking brakes of the vehicle are released. Such spring parking brakes are conventionally employed on large vehicles such as heavy freight trucks. These parking brakes are automatically applied by strong springs when there is a failure of air pressure in the compressed air system of the vehicle, for example, they are applied whenever the pressure in the compressed air system falls below a predetermined pressure, say 60 pounds per square inch. During normal operation of the vehicle, when the driving engine is running, an air compressor driven by this engine maintains the air pressure in a compressed air storage tank substantially above said predetermined pressure.

The spring operated parking brakes are also under control of the operator of the vehicle even when the pressure in the compressed air system is above that necessary to hold the brakes in released position. Thus a spring brake control valve 14 is provided with a control knob 88 in the operators compartment of the vehicle. In the normal or brake release position of the valve 14, the control knob 88 is pulled out, i.e., is in its leftmost position in FIG. 2. In this position the valve supplies air under pressure from a conduit 90 connected to the supply tank for compressed air through a conduit 92 to the spring parking brakes to thus release the brakes.

The conduit 86 leading to the throttle locking control valve 12 is also connected to the conduit 92 through a T 94 and when the spring brakes are released by pressure supplied through the conduit 92, this pressure is also supplied through the conduit 86 to the right end of bore 72 in the throttle locking control valve 12 in FIG. 1 so as to move the valve spindle 74 to the position shown in FIG. 2, and thus release the compressed air in the cylinders of throttle locking mechanism 10 to thereby release the plate 20 and free the throttle linkage. Even if the operator of the vehicle employs enough force on the knob 84 to move the spindle 74 of the valve 12 toward the right in FIG. 1 to against the air pressure supplied to the conduit 86, to thus temporarily lock the throttle linkage, the valve spindle 74 will be immediately again returned to the position shown in FIG. 1 by the pressure in the conduit 86 whenever the spring brakes are released.

Upon parking the vehicle, the operator can pull the control knob 88 of the spring brake control valve 14 to connect the conduit 92 to an exhaust port 96 of the valve 14 and thus release the pressure in the conduit 92 and in the spring brake release mechanism to thereby apply the spring brakes. This also releases the pressure from the end of the plunger 74 of the throttle locking control valve 12 so that the operator can adjust the engine speed to the desired value, by depressing the accelerator of the vehicle and then lock the throttle linkage in adjusted position by pushing in the knob 84 of the valve 12.

Figure 4:
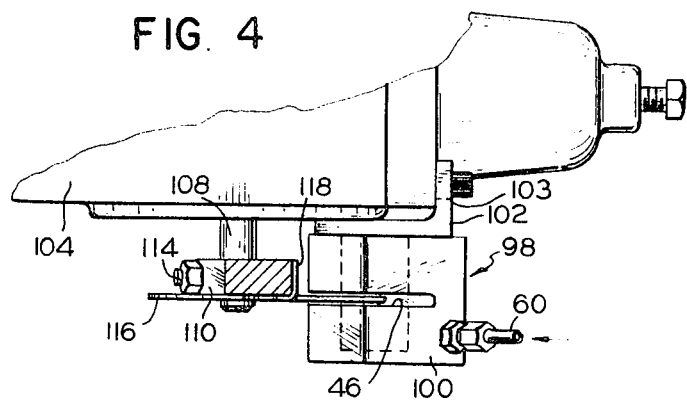
FIG. 4 is a fragmentary horizontal sectional view taken on the line 4—4 of FIG. 3.

Embodiments of FIGS. 3 and 4

Another embodiment suitable for installation on a truck equipped with another type of diesel engine, for example, a Cummins engine equipped with a PT pump system, is shown in FIGS. 3 and 4, the throttle locking mechanism 98 has a plate locking structure 99 with a plate clamping portion 100 and a support portion 102 in the form of an angle member, also forming the cover portion of the plate clamping portion 100. The angle member 102 has a flange 103 secured to an end of the governor and fuel pump housing 104 of the engine which in turn is secured to one end of the air compressor housing 106 of the engine. A throttle control shaft 108 projects horizontally from the housing 104 and has a speed control arm 110 secured to and extending at right angles to the throttle control shaft 108. A throttle control push rod 112 is pivotally connected to the other end of the arm 110 and is moved to the left in FIG. 5 to advance the throttle when the accelerator of the truck is depressed.

The speed control arm 110 has an apertured and slotted end clamped to the shaft 108 by a bolt 114. An arcuate plate 116 provided with an aperture receiving the end of the throttle control shaft 108 also has a flange 118 extending along one side of the arm 110. This flange has an aperture through which the bolt 114 extends to secure the plate 116 to the arm 110. The arcuate plate 116 is thus pivoted about the axis of the throttle control shaft 108 in a direction parallel to the faces of this plate when the arm 110 is pivoted about this shaft.

The arcuate portion of the plate 116 is received in the slot 46 of the plate clamping portion 99 of the plate locking structure 100 of the throttle locking mechanism 98 and this plate clamping portion may be entirely similar to the plate locking structure 16 of the throttle locking mechanism of FIGS. 1 and 2, except for the manner of mounting it upon the engine of the vehicle. A compressed air supply conduit 60 which may be the same as the conduit 60 of FIGS. 1 and 2 supplies compressed air through a throttle locking control valve 12 to actuate the plungers of the throttle locking mechanism 98 of FIGS. 3 and 4.

In FIG. 3, the linkage 112 is above the level of the control shaft 108. In certain throttle arrangements, the linkage 112 would be disposed below the shaft 108. In such instance, the plate 116 would project upwardly with the lobe extending to the left as the parts are shown in FIG. 3. This location would require that the locking mechanism 98 be mounted on the left hand side of the pump housing 104 instead of the right side. This would be accomplished by utilizing a bracket like bracket 103 but adapted to receive two of the bolts 121 which secure the spacer 107 to the left hand end of the housing 104.

The operation of the throttle locking mechanism 98 of FIGS. 3 and 4 is the same as the operation of the throttle locking mechanism 10 of FIGS. 1 and 2. It will be understood that the throttle locking system including the mechanism of FIGS. 3 and 4 will include a throttle locking control valve 12, such as shown in FIG. 1, connected to the conduit 60 and to a source of compressed air through a conduit 68. Such valve will also be connected to the compressed air supply system for the spring applied parking brakes of the vehicle through a conduit 86 so that the throttle locking mechanism will be released whenever the spring brakes are released by the application of compressed air to the releasing mechanism for such brakes. It is to be noted that any possible lost motion in the throttle linkage is taken up prior to applying the throttle lock even if the locking mechanism is not applied directly to the throttle control shaft, and that the movable member of the locking mechanism need not be a flat plate nor is it essential that its motion be pivotal.

In the particular engines disclosed and in the case of most engines used in large sized freight trucks, the throttle control shaft, such as the throttle control shaft 24 of FIGS. 1 and 2 and the throttle control shaft 108 of FIGS. 3 and 4, directly controls the position of the throttle of the engine under ordinary driving conditions. The governor mechanism of such engines superimposes an engine speed control on the throttle to maintain the idling speed of the engine substantially constant when the accelerator of the vehicle is in its released position so that the throttle linkage is in its idle position. The governor mechanism also limits the maximum speed of the engine. Thus the governor sets the lowest or idling speed of the engine, also sets the highest or maximum speed of the engine, but between these extremes, the speed of the engine varies with both the position of the throttle linkage and the load on the engine. This load on the engine will be substantially constant under parking conditions when the engine has been warmed up and auxiliary devices such as air conditioning equipment is being driven by the engine, so that setting of the throttle at a selected position to drive the engine above idling speed will result in a substantially constant speed.

After the truck is parked and the spring brakes applied by actuation of the spring brake control valve 14, the operator can select the desired engine speed by controllably depressing the accelerator and when this speed has been obtained, can actuate the throttle locking control valve 12 to lock the throttle in the selected position. Any time the spring brakes are released by applying pressure to the spring brake release mechanism by actuation of the spring brake control valve 14, the throttle lock will also be released by air pressure transmitted to the throttle locking control valve 12 through the conduit 86. It will be apparent that the throttle locking mechanism of the present invention can be applied to substantially any type of internal combustion engine, irrespective of whether such engine includes a governor or is associated with a vehicle having spring operated parking brakes. This can be done by adaptions of the structure for securing a movable plate to the throttle linkage and suitable adaption of the support for securing the plate locking structure of the throttle locking mechanism to a stationary part of the engine.

While the system has been shown as being operated by compressed air, it could be actuated by hydraulic fluid, such as is available from the power steering pump or the hydraulic brake system.

I claim:

1. A throttle locking system for an internal combustion engine with a throttle controlled through a movable throttle linkage, said system comprising:

a movable member having means for connecting said member to said throttle linkage for positive movement of said member by said linkage when the throttle linkage is moved in either direction to change the throttle setting of said engine;

said member having surfaces on opposite sides of said member extending in the direction of movement of said member;

releasable locking means for said member including spaced clamping elements for said member and means for mounting said locking means on a stationary part of said engine with said clamping elements on said opposite sides of said member;

said locking means having force applying means for causing said clamping elements to engage said surfaces to clamp said member against movement and thereby lock said throttle linkage in a fixed position relative to said engine;

and control means for said force applying means to enable the operator of said engine to select a throttle setting for said engine and then lock said throttle linkage in said fixed position.

2. A system in accordance with claim 1 in which said force applying means includes means for balancing the forces applied to the opposite sides of said member to substantially eliminate any resulting force tending to move said member in a direction sideways of said member.

3. A system in accordance with claim 1 in which the system includes a compressed air source, said force applying means includes a cylinder and plunger and said control means is a manually actuated valve means for supplying compressed air to said cylinder.

4. A system in accordance with claim 3 in which the force applying means has a cylinder and plunger on each side of said member with a conduit interconnecting said cylinders and said plungers have equal piston areas.

5. A system in accordance with claim 4 in which said member is a flat plate having parallel side surfaces and said clamping means comprises flat surfaces parallel to said side surfaces on the ends of said plungers.

6. A system in accordance with claim 5 in which said member is an arcuate plate having means for securing said plate to a pivotally movable arm forming a part of said throttle linkage with the side surfaces of said plate extending substantially normal to the axis of pivotal movement of said arm.

7. A system in accordance with claim 1 in which said engine is the driving engine of a vehicle having parking brakes and release means to release said parking brakes and said system includes means responsive to said release means for releasing said locking means to thereby unlock said throttle linkage when said parking brakes are released.

8. A system in accordance with claim 7 in which said parking brakes are spring operated and includes compressed air operated release means for releasing said brakes and said control means includes compressed air actuated means responsive to the pressure of the air in said compressed air operated means for releasing said locking means.

9. A throttle locking attachment for the engine of a vehicle having a dashboard in front of a driver's compartment, an internal combustion engine in an engine compartment, and a throttle system extending from the driver's compartment to the engine compartment, power operated means, mounting means for mounting said power operated means within said engine compartment next to a positively moved portion of said throttle system, said power operated means having means for lockingly engaging said portion of said throttle operated means in any position of said portion to releasably prevent motion of said portion in the particular position of said portion at the time of operation of said power operated means, power supply means for connecting a source of power to said power operated means, and control means for said power supply means to facilitate selective actuation of said power operated means, and means for mounting a control portion of said control means on said dashboard to facilitate remote control of said power operated means.

References Cited
UNITED STATES PATENTS

| | | | |
|---|---|---|---|
| 2,171,401 | 8/1939 | McCoy | 123—98X |
| 2,742,123 | 4/1956 | Exline | 251—94X |
| 2,799,367 | 7/1957 | Dotto | 188—72.5 |

WENDELL E. BURNS, Primary Examiner

U.S. Cl. X.R.

123—198; 188—272.5; 192—3; 251—94